(12) United States Patent
Grossman et al.

(10) Patent No.: US 8,233,006 B2
(45) Date of Patent: Jul. 31, 2012

(54) TEXTURE LEVEL TRACKING, FEEDBACK, AND CLAMPING SYSTEM FOR GRAPHICS PROCESSORS

(75) Inventors: Mark S. Grossman, Palo Alto, CA (US); Thomas Frisinger, Shrewsbury, MA (US); Daniel M. Gessel, Newton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 964 days.

(21) Appl. No.: 12/249,316

(22) Filed: Oct. 10, 2008

(65) Prior Publication Data

US 2010/0091028 A1    Apr. 15, 2010

(51) Int. Cl.
    G09G 5/00          (2006.01)
    G09T 17/00         (2006.01)
(52) U.S. Cl. .......................... 345/587; 345/428; 345/582
(58) Field of Classification Search .................. 345/428, 345/582–588
    See application file for complete search history.

(56) References Cited

U.S. PATENT DOCUMENTS

| | | | | |
|---|---|---|---|---|
| 5,831,624 A | * | 11/1998 | Tarolli et al. | 345/587 |
| 6,522,337 B1 | * | 2/2003 | Morioka | 345/582 |
| 7,538,773 B1 | * | 5/2009 | Hutchins | 345/582 |
| 7,944,453 B1 | * | 5/2011 | Newhall, Jr. | 345/587 |
| 2011/0157205 A1 | * | 6/2011 | Tao et al. | 345/582 |
| 2011/0157206 A1 | * | 6/2011 | Duluk et al. | 345/582 |
| 2011/0157207 A1 | * | 6/2011 | Hall et al. | 345/582 |
| 2012/0038657 A1 | * | 2/2012 | Grossman et al. | 345/585 |

\* cited by examiner

*Primary Examiner* — Xiao M. Wu
*Assistant Examiner* — Andrew Shin
(74) *Attorney, Agent, or Firm* — Volpe and Koenig, P.C.

(57) ABSTRACT

Embodiments include a texture mapping processor incorporating a dynamic level of detail map for use in a graphics processing system. Level of detail values are defined, with 0 being the finest and corresponding to the largest mipmap level. Each bound texture in a graphics object is assigned an identifier. This identifier is used as an index into a minimum-LOD value tracking table that is updated whenever a texel is fetched. A texture processing module controls when the tracking table is initialized and read back, and which identifiers are tracked. The minimum-LOD values in the tracking table are accompanied by a coarse region access mask to associate a minimum LOD value with a specific region of the image or object. A clamping table contains LOD clamp values for each region and a region code that specifies the coarseness of the LOD associated with each region of the texture.

15 Claims, 5 Drawing Sheets

TEXTURE LEVEL TRACKING, FEEDBACK, AND CLAMPING SYSTEM FOR GRAPHICS PROCESSORS

TECHNICAL FIELD

The disclosed embodiments relate generally to graphics processors, and more specifically to methods and systems for efficiently loading texture maps in graphics processing systems.

BACKGROUND OF THE DISCLOSURE

Digital video systems typically employ one or more graphics processing units (GPU) to process video data. A GPU may be a dedicated graphics and video rendering device for computers, workstations, game consoles, and similar digital processing devices. A GPU is usually implemented as a co-processor component to the central processing unit (CPU) of the computer, and may be provided in the form of an add-in card (e.g., video card), co-processor, or as functionality that is integrated directly into the motherboard of the computer or into other devices (such as, for example, Northbridge devices and CPUs).

One common function of graphics processor units is to process texture information. Texture mapping is a method for adding detail, surface texture, or color to a computer-generated graphic or 3D (three-dimensional) model. In this process, a texture map is applied to the surface of a shape. A texel (texture element or texture pixel) is the fundamental unit of texture space used in computer graphics, and textures are represented by arrays of texels. When texturing a 3D surface, the texture mapping process maps texels to appropriate pixels in the output picture. If a texel is requested that is not on an integer position, a texture filtering process is applied, and if a texel is requested that is outside of the texture, a combination of clamping and wrapping techniques is used. Clamping limits the texel to the texture size, and wrapping moves the texel back into the texture.

Texture filtering governs the way that resulting pixels on the screen are calculated from the texels. In texture filtering, pre-calculated, optimized collections of bitmap images that accompany a main texture, referred to as 'mipmaps' are used to increase rendering speed and reduce artifacts. Mipmaps are widely used in many graphics applications such as 3D computer games, flight simulators and other 3D imaging systems.

Each bitmap image of the mipmap set is essentially a version of the main texture, but at a certain reduced level of detail (LOD). Accounting for level of detail involves decreasing the complexity of a 3D object representation as it moves away from the viewer or according other metrics such as object importance, eye-space speed, or position. LOD techniques increase the efficiency of rendering by decreasing the workload on graphics pipeline stages. The reduced visual quality of the model is often unnoticed because of the small effect on object appearance when distant or moving fast. Present graphics APIs (application program interfaces) typically only allow the loading of an entire mipmapped texture at the time it is bound for use in drawing. In present systems, to avoid loading the entire set of mipmaps, the application usually calculates the LOD itself before loading the actual texture. However, this method is generally difficult and inaccurate. It also often results in the loading of mipmap levels and regions that are not required during rendering.

What is desirable, therefore, is an intelligent texture pre-load method that avoids loading large amounts of a texture image that may never by touched or accessed.

What is further desirable is an LOD and region clamping and usage reporting mechanism that allows an application or driver to manage the amount of texture data to load over time.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
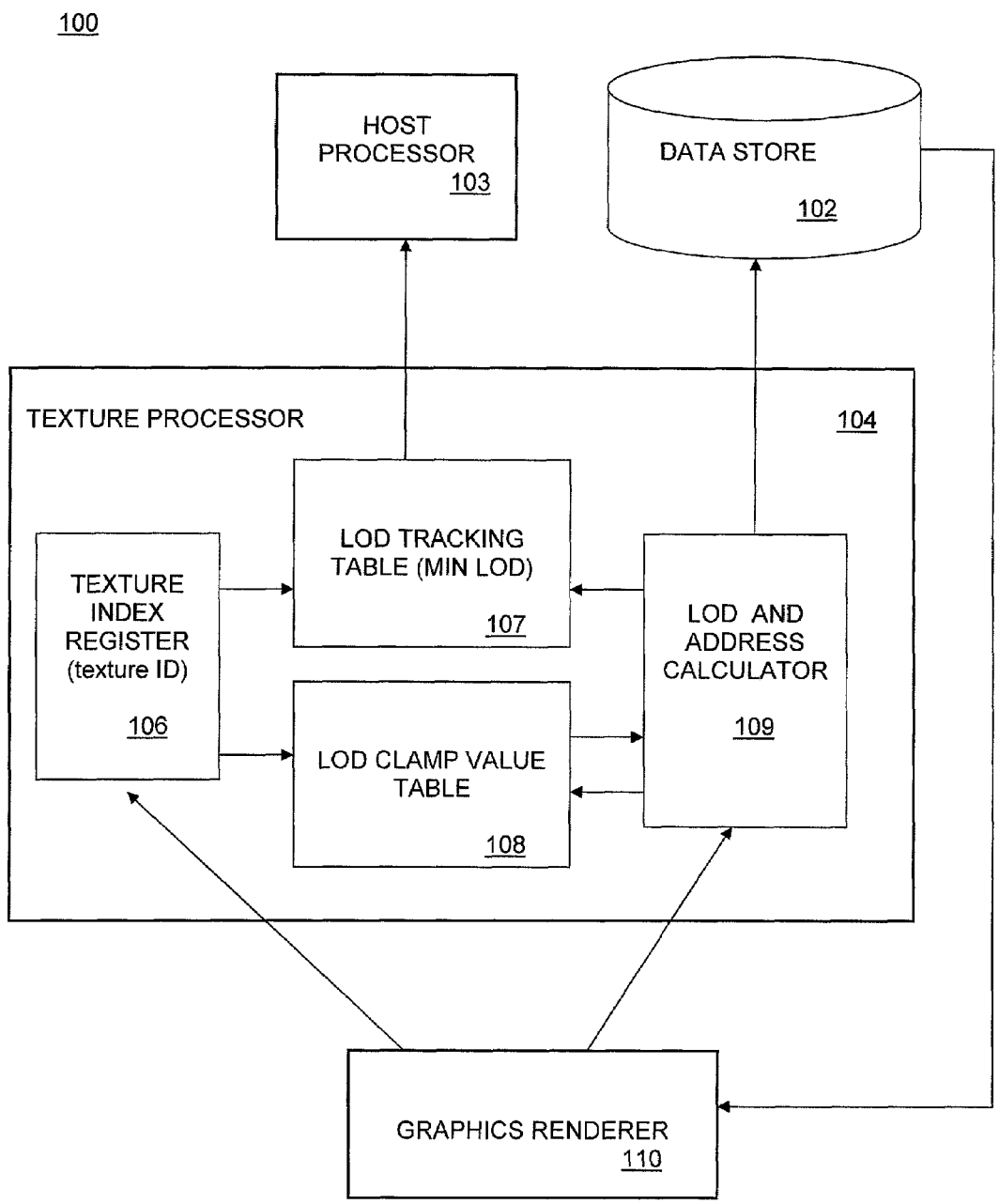
FIG. 1 illustrates a block diagram of a graphics processing system implements a texture level tracking and clamping process, under an embodiment.

Embodiments of the invention as described herein provide a solution to the problems of conventional methods as stated above. In the following description, various examples are given for illustration, but none are intended to be limiting.

Embodiments include a texture mapping processor incorporating a dynamic level of detail tracking map for use in a graphics processing system. Texture mapping generally refers to a method for adding detail, surface texture, or color to a computer-generated graphic or 3D model, in which a texture map is mapped to the surface of a shape or polygon, such as the triangles that make up a wire-frame model. Texture coordinates are specified at each vertex of a given triangle, and these coordinates are interpolated through one or more algorithmic methods. In texture filtering, optimized collections of bitmap images, called "mipmaps" accompany a main texture to help increase rendering speed and reduce artifacts. Mipmap sizes generally depend on the size of the image being rendered. For example, if the texture has a basic size of 256 by 256 pixels, the associated mipmap set may contain a series of eight images, each of which is one quarter the total area of the previous one, that is 128×128, 64×64, 32×32, 16×16, 8×8, 4×4, 2×2, 1×1 (a single pixel).

Each bitmap image of the mipmap set is a version of the main texture, but at a certain reduced level of detail. Although the main texture would still be used when the view is sufficient to render it in full detail, a graphics renderer will switch to a suitable mipmap image when the texture is viewed from a distance or at a small size. This switch allows rendering speeds to increase since the number of texels being processed is often much lower than with simple textures. Artifacts are reduced since the mipmap images are effectively already anti-aliased, taking some of the burden off the real-time renderer. Scaling down and up is often made more efficient with mipmaps as well.

A general method of implementing the scaling up and down of images is to divide a texture into different levels of detail and switch to a greater number of texels until the finest level of detail is reached. The highest number of texels corresponds to the greatest LOD, and the lowest number of texels corresponds to the lowest LOD. For a level of detail in between the highest and lowest levels, a blend of texels in the two levels is performed. In many cases, not every level of detail for objects or regions of a display area will be needed. For example, if an object is always displayed from a long-distance, then the greater levels of detail are not required, and likewise, if the object is constantly displayed in close-up, then the lower levels of detail are not required. In this case, an LOD clamp is used to limit how fine the LOD resolution for the object or region will be provided. An LOD clamp specifies the LOD level up to a certain level, and allows no greater LOD level to be used. In many present systems, this requires advance knowledge of the levels of detail that will not be required. In certain graphics processing systems, such as the DirectX 11 standard (DX11), the LOD clamp is a parameter value that is set within a routine or program of the GPU processor. This value represents a hard-coded parameter that sets the LOD clamp. In the event that a finer level is needed, the clamp needs to be reset, which adds processing overhead and delay.

A texture image is specified by texture coordinates, and is considered to lie in a square in (s, t) parameter space in the range $0<=s<=1, 0<=t<=1$. In general, a geometric primitive is provided, with each vertex tagged with (s, t) texture coordinates. When texturing is enabled, the appropriate portion of the texture image is pasted onto each face of the textured object. The clamp function determines the meaning of texture coordinates outside of the coordinate range.

In one embodiment, an improvement to present LOD clamping methods is provided by a texture mapping component that incorporates a dynamic LOD tracking map for use in a graphics processing system. Level of detail values are defined for bound textures, with 0 being the finest and corresponding to the largest mipmap level. A bound texture is a texture that is being rendered in a current frame of a drawing, and each bound texture in a graphics object is assigned an identifier. This identifier is used as an index into a minimum-LOD value table that is updated whenever a texel is fetched, and is used for both tracking and clamping functions. A texture processing module comprising one or more functional components controls when the table is initialized and read back, and which identifiers are tracked. The minimum-LOD values in the table are accompanied by a coarse region access mask to associate a different minimum LOD values with specific regions of the image or texture-mapped object. As the current minimum LOD value for a particular texture changes, the tracking logic revises the region mask to reflect that new minimum value.

In one embodiment, a texture processing system utilizes an LOD value table to flexibly provide different LOD values that can be used to set the level of detail when rendering an object. This table is indexed by the texture identifier as described above, and may further be indexed by region, allowing a different LOD values to be specified for different regions. This allows an application to load into memory only the amount of data required to achieve the desired visual result. Such a system can be provided as part of a graphics processing unit (GPU), or a component module that is used in conjunction with a graphics processing unit. FIG. 1 illustrates a block diagram of a graphics processing system that implements a texture level tracking and clamping process, under an embodiment. For the video system 100 of FIG. 1, the texture processor 104 includes a number of processing components (or modules) that process textures used by a graphics renderer 110 for one or more applications running on a host processor 103. Such an application may be a user application, tool, library, driver software, or similar executable program. A data store 102 stores one or more parameters of objects related to texture processing for a graphics rendering system. These can include texture objects as well as geometric descriptions, and the like. Graphics renderer 110 receives descriptions of textured objects from the data store 102. It then loads a texture index register 106 with an identifier of a particular texture map to be either tracked or rendered with the clamping function enabled.

The texture processor 104 includes an LOD tracking table 107 that stores the minimum LOD value for storing and providing (tracking) LOD values for bound textures. In general, tracking is the process of gathering information to send back to the application regarding which levels of texture were used. The tracking table associates a region of an image consisting of a plurality of texels with a minimum rendered level of detail. A portion of the tracking table, or a separate tracking table can also associate a region of an image consisting of a plurality of texels with a maximum level of detail. Processor 104 also includes a separate LOD clamp value table (or "clamping table") 108, which stores the clamp values that limit how fine the LOD resolution for the texture that will be provided for a particular region. The LOD clamp specifies the LOD level up to a certain level, and allows no greater LOD level to be used.

The graphics renderer 110 sends texture coordinates (s and t for 2-dimensional texture maps) for each pixel to be rendered to an LOD and address calculator component 109. The LOD and address calculator component 109 calculates the LOD to be used for each pixel. This LOD value, along with the most significant bits (MSBs) of the s and t coordinate values are then transmitted to the LOD clamp value table 108 where the LOD clamp value is found. The LOD clamp value is sent back to the LOD and address calculator component 109 for clamping. The LOD and address calculator component 109 also transmits the original (pre-clamped) calculated LOD along with the most significant bits of the s and t coordinates to the LOD minimum value table 107 for recording. At a later time determined by software, the contents of the LOD minimum value table 107 are fed back to the application running on the host processor 103 so it can determine which parts of each texture to load or discard for subsequent rendering.

In one embodiment, the texture processing system 104 may be implemented as part of a GPU for use in a computer processing system, such as a workstation or personal computer. Data store 102 may be a local disk storage unit coupled directly to a computer having host processor 103, or remotely coupled to the computer over a network.

Figure 2:
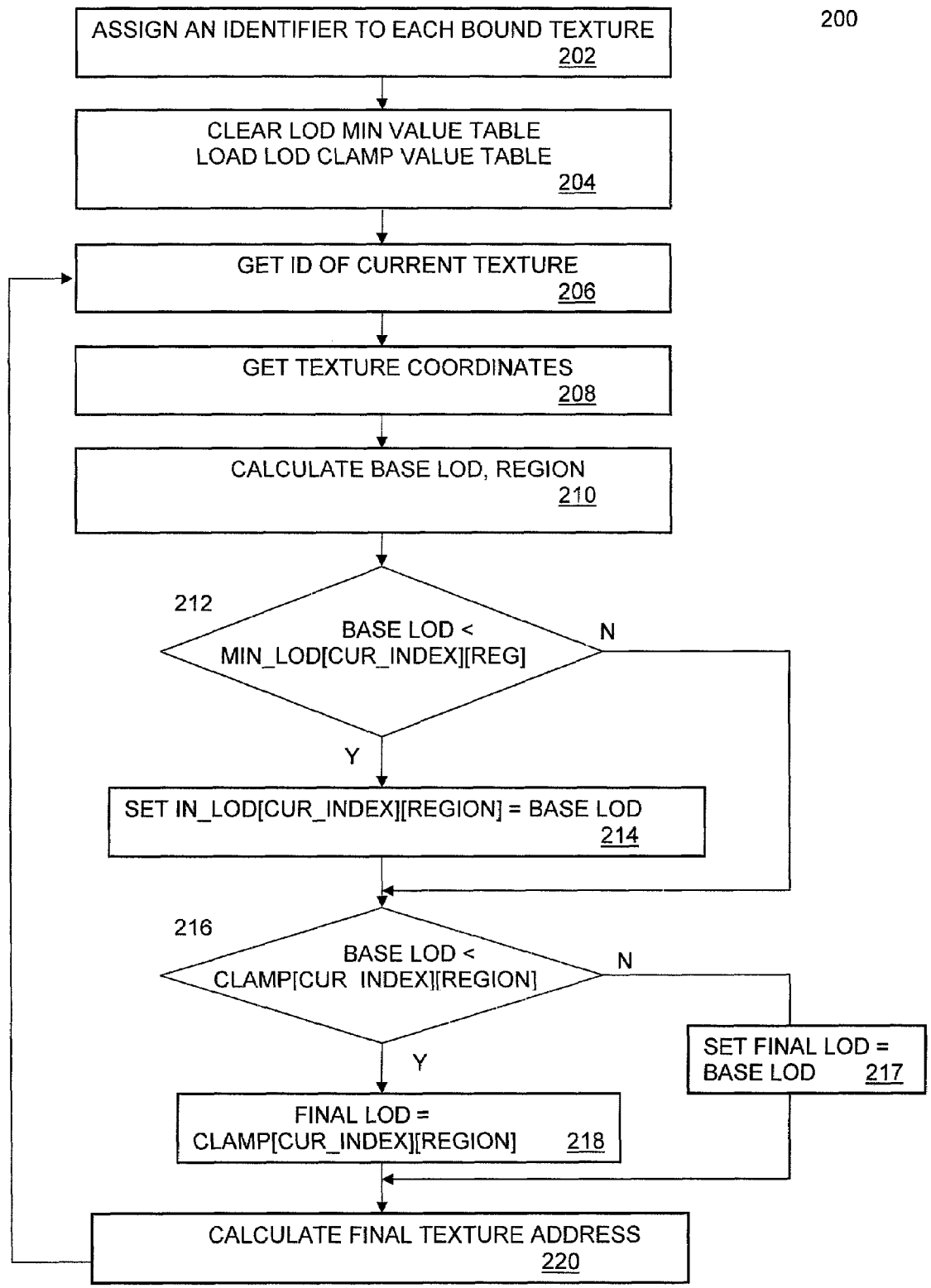
FIG. 2 is a flowchart illustrating a method of a texture level tracking and clamping process, under an embodiment.

FIG. 2 is a flowchart illustrating a method of a texture level tracking and clamping process, under an embodiment. In this method, a texture mapping processor incorporating a dynamic level of detail map for use in a graphics processing system. Level of detail values are defined, with 0 being the finest and corresponding to the largest mipmap level. Each bound texture in a graphics object is assigned an identifier. This identifier is used as an index into a minimum-LOD value table 107 to locate an entry that is updated whenever a texel is fetched. The identifiers can also be tracked to monitor the maximum LOD values that are used. In one embodiment, the minimum-LOD value table 107 assigns LOD values to separate regions of the image. The image may be divided into any practical number of regions, usually denoted region A, region B, region C, and so on. The table represents a region access mask that specifies that a particular region must be rendered with a minimum level of detail.

In the method of FIG. 2, each bound (i.e., designated for current use) texture is assigned an identifier, block 202. In block 204 the LOD minimum value table 107 is cleared and the LOD clamp value table 108 is loaded with a clamping value. In block 206, the texture identifier for a current bound texture is fetched and provided by index register 106 to the LOD minimum value (tracking) table 107. The current texture ID is obtained from the command stream from the renderer 110, and the table 107 is updated whenever a texel is fetched. The texture coordinates for a particular pixel in the triangle being rendered are then obtained, block 208.

In block 210, the base LOD and region are calculated in the LOD and address calculator 109. The base LOD is the LOD that is generated by the renderer 110, and corresponds to the LOD that the renderer is initially requesting for a particular region, based directly on the supplied texture coordinates. The region is the coarse version of the texture coordinates. The base LOD calculated in block 210 is then compared to the minimum LOD that is currently held in the minimum LOD tracking table 107 for the current index specified by register 106. If, in block 212, the base LOD is less than the minimum LOD value, then this minimum LOD value is set equal to the base LOD value. If, in block 212, the base LOD is greater than or equal to the minimum LOD value in table 107, then the tracking table entry is left unchanged.

For an embodiment in which LOD value clamping is performed, the process of flowchart 200 proceeds to decision block 216, in which the base LOD value is compared to the current clamping value. If, in block 216, it is determined that the base LOD is greater than or equal to the clamping value, the final LOD value (FINAL_LOD) is set equal to the base LOD value, block 218. The final LOD value is used to reference the texture map, and the final texture address is then calculated, block 222. The process 200 then proceeds from block 206 for the next current texture. If, in block 216, it is determined that the base LOD is less than the clamping value, the final LOD value is set to the clamp value, block 218, and the process then calculates the final texture address, block 222.

In general, the texture processor 104 tracks the LOD value for a current texture specified by the index register 106. The minimum-LOD values in the table are accompanied by a coarse region access mask to associate a minimum LOD value with a specific region of the image touched as objects are rendered. The process of updating the region mask starts over if the minimum LOD value encountered during rendering is lowered. As shown in FIG. 2, a table of minimum LOD values is first created. Any practical number of LOD values can be defined, with one LOD value per bound texture. In a typical implementation, twelve different levels may be defined ranging from 1-by-1 pixel ($2^0$) to 2K-by-2K pixels ($2^{11}$), requiring four bits of LOD. LOD values in the LOD clamp value table 108 may also include a fractional part representing a transition between two levels of a texture map, for instance four bits representing 16 gradations.

Embodiments of process 200 can be configured to work with images that are composed of multiple regions or only a single region. The process also works if there is only a single level of texture map. In this case, the clamping table region value stored in table 108 (1 bit) indicates that no texels are loaded or present and a basic color should be supplied for any texel in that region.

Figure 3:
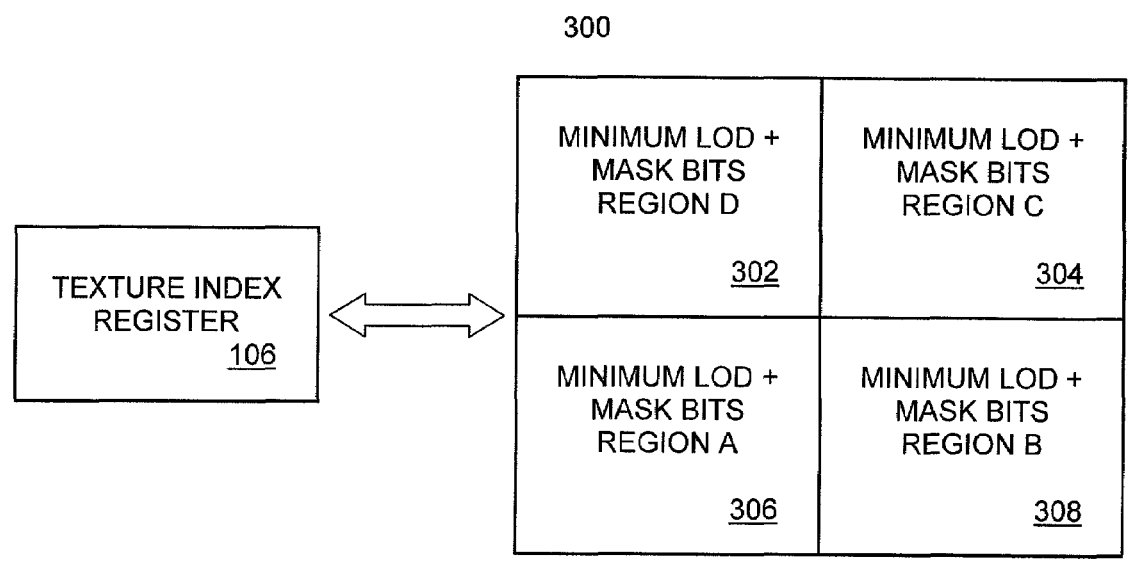
FIG. 3 illustrates a minimum-LOD value table for use in a texture processing system, under an embodiment.

FIG. 3 illustrates a minimum-LOD value table for use with multi-region images in a texture processing system, under an embodiment. The texture index register 106 references a table 300 that has one entry per texture. Each identifier for a bound texture is placed in an entry of the table 300, each with a number of cells, with the cells representing different regions of the texture image. As shown in FIG. 3, table 300 is an example of a two-entry table with four cells representing four regions. A typical implementation may have on the order of 128 or more textures. For one entry, cell 302 stores the minimum LOD value for region D, cell 304 stores the minimum LOD value for region C, cell 306 stores the minimum LOD value for region B, and cell 308 stores the minimum LOD value for region A. Although a two-entry 2×2 size table is shown in FIG. 2, based on one bit each of the s and t coordinates used to identify the region, it should be understood that the table size can vary depending on the number of simultaneously bound textures and the number of regions in which the image is divided.

Table 300 is essentially used to track the minimum LOD accessed during rendering, by region and represents a structure of the LOD minimum value tracking table 107 of FIG. 1, under an embodiment. Each cell can contain a number of bits (e.g., four bits) for an integer representing an LOD value for the region. As an alternative, each table entry can contain a single LOD value representing the minimum touched in any region, plus one mask bit for each region indicating which regions were touched at that LOD. It is understood that any region without its mask bit set was accessed at a higher LOD or not accessed at all.

Figure 4:
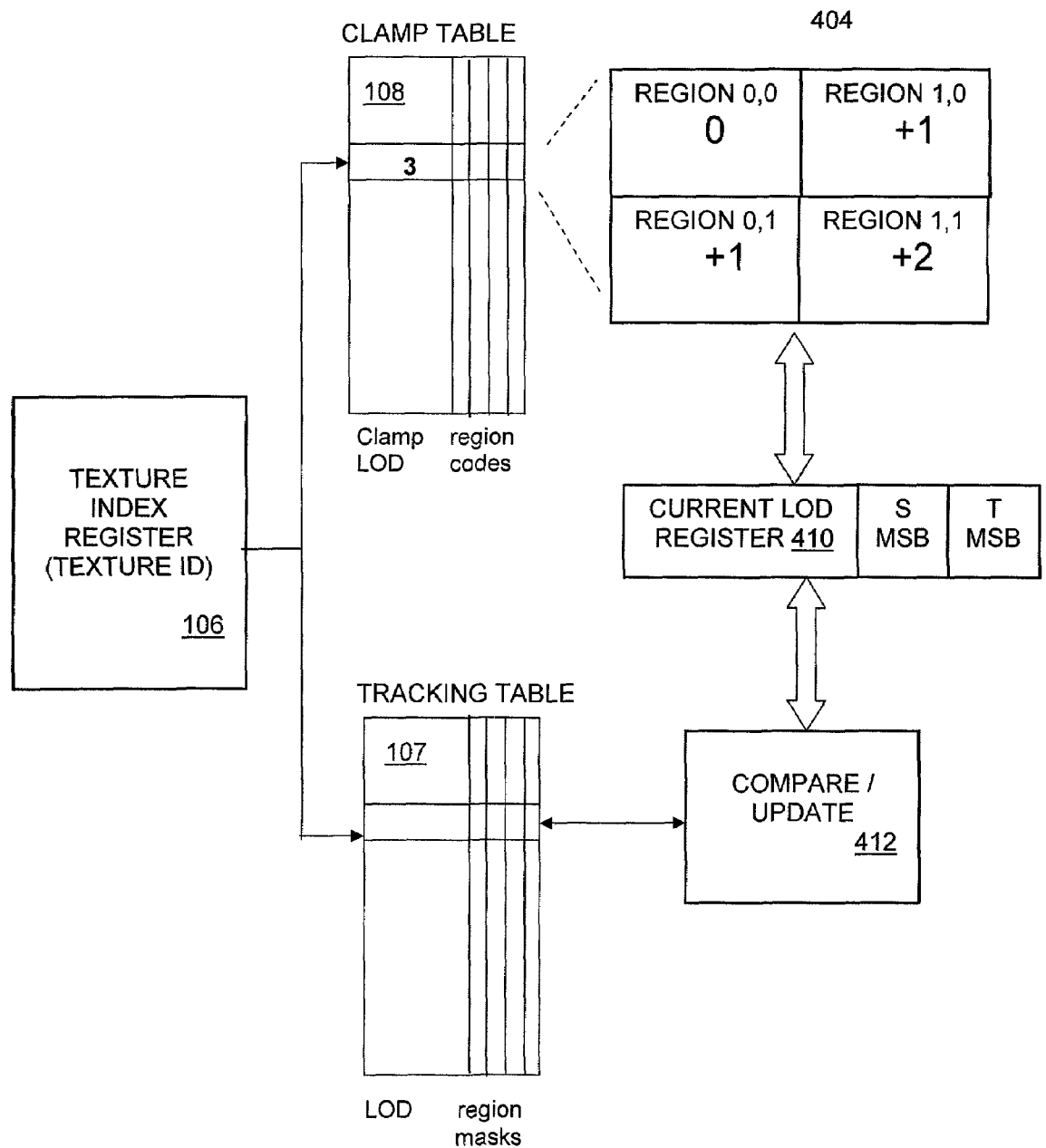
FIG. 4 illustrates the combined use of the tracking table and clamping table to specify which regions of the texture are loaded with a particular LOD value, for each texture, under an embodiment.

As shown in FIGS. 1 and 2, the texture processor 104 includes both a tracking table and a clamping table to track and set the final LOD value used to calculate the final texture address. FIG. 4 illustrates the combined use of the tracking table and clamping table to specify which regions of the texture are loaded with a particular LOD value, for each texture, under an embodiment. As shown in FIG. 4, the texture index register 106 provides a texture ID that points to corresponding entries in the clamping table 108 and the tracking (minimum LOD value) table 107. The tracking table 107 contains a set of LOD values and the corresponding region mask bits. The current LOD value of the tracking table, as specified by the current texture ID is compared and updated by the texture processor during rendering, as shown in block 212 of FIG. 2, in a compare/update process 412. This value is stored in the current LOD register 410, which stores the LOD value as well as the most significant bits of the s and t coordinates.

The clamping table 108 includes a set of clamp values and corresponding region codes for each texture. As shown in FIG. 2, the base LOD is either overridden by the clamp LOD value in block 218 or it remains the same in block 217. Each texture has a basic clamp value, such as clamp value 3 for the example shown in FIG. 4. This value specifies the finest level for any region. The region codes specify whether to use the basic LOD clamp value or a larger clamp value for that region, where larger clamp values specify how much coarser the LOD should be for that region. In one embodiment, the code could consist of two bits that specify region codes of 0, +1, and +2. As shown in FIG. 4, the region codes for the clamp value of the texture identified by the texture ID are shown in table 404. In this example, the code value of 0 for region 0,0 corresponds to the finest LOD value, the code value of 1 for regions 0,1 and 1,0 correspond to the next coarser LOD value, and the code value of 2 for region 1,1 corresponds to the second coarser LOD value. The clamp value (e.g., 3) dictates that for a particular clamp value in a region, there is no need to load any texture that is finer, with a clamp value of 0 being the finest.

The clamping table essentially stores LOD clamp values for the bound textures to be mapped and it is configured to store the finest level of detail loaded for the textures. Each entry in the clamping table comprises an LOD clamp value and an individual cell for each texture region of the texture regions. Each cell contains a region LOD value code, which defines an LOD level finer than texture regions with corresponding LOD values that will not be loaded to the mipmap.

For the embodiment of FIG. 4, discrete demarcations between codes for each region are defined. In an alternative embodiment, a smoothing function may be used to assign LOD clamp values for texels in different parts of the regions. As shown in FIG. 2, the coarse s and t coordinates from the current LOD register 410 specify the region to be processed. However, the current region and the neighboring regions can be read and used in a smoothing function to produce the final LOD clamp value.

Figure 5:
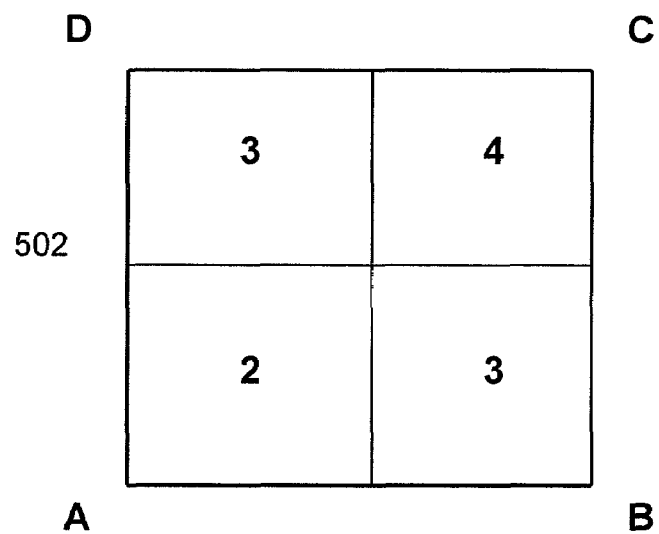
FIG. 5 illustrates the transition from a discrete LOD clamp to a gradual LOD clamp, under an embodiment.
Figure 5:
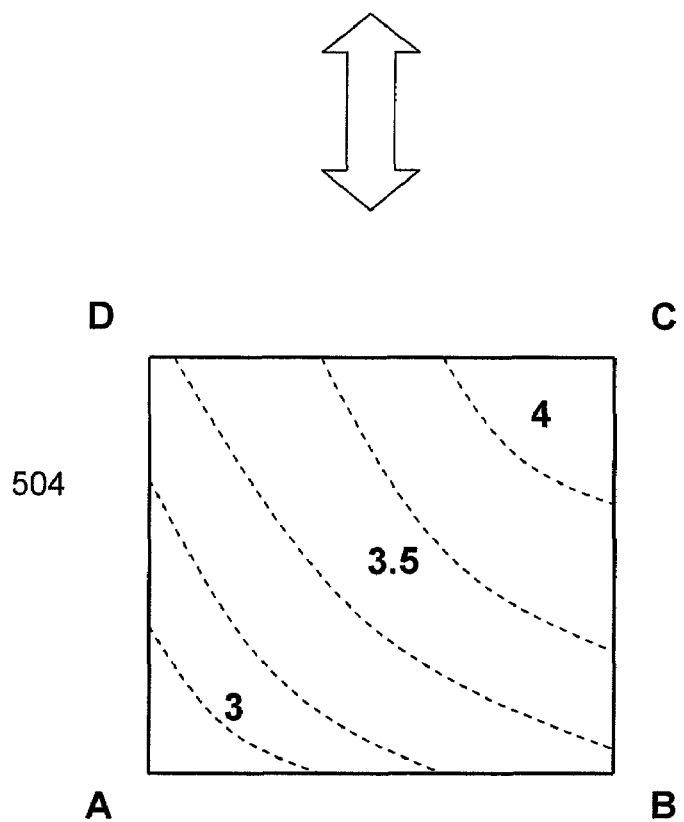

FIG. 5 illustrates the use of discrete LOD clamp values to produce a smoothed LOD clamp, under an embodiment. As shown in FIG. 5, a discrete LOD clamp value table 502 contains individual example LOD clamp values for each of the regions A, B, C, and D. In one embodiment, a linear interpolation method is used to produce a smooth distribution of LOD clamp values 504. The smooth distribution 504 of LOD clamp values is generated by filtering through interpolation the same looked up clamping table region values, instead of just sampling one region. In general, the values used for a particular texel may not extend across a full range, but instead they will be somewhere close to or in between the values read from the table and typically lie between zero and a maximum value.

In one embodiment, the coarse region masks of FIG. 3 may be of 1-bit resolution for each axis of a two-dimensional texture image. In general, each cell is $1/N^{th}$ of the LOD level, where N is the number of regions. For an embodiment in which there are two bits per cell (2-bit embodiment) a four-bit LOD register is used, which yields 16 LOD levels.

In one embodiment, the texture processing system includes a maximum LOD (maxLOD) tracking process. The maxLOD tracking process monitors the LOD values accessed in the tables. The maxLOD clamps the regions of the mipmap image arrays to a subset of the arrays that would otherwise be considered, and thus specifies what does not need to be loaded. Depending upon implementation, the maxLOD clamp can save up to approximately ⅓ the number of pixels from being loaded.

The mipmap process utilizing a texture processing and LOD clamping method of one or more embodiments essentially pre-filters the texture and stored it in smaller sizes down to a single pixel. As the textured surface moves farther away, the texture being applied switches down to the prefiltered smaller size. As stated above, the different sizes of the mipmap are the LOD values, with level 0 being the largest size (closest to view), and increasing levels are used at increasing distances.

For this embodiment a maximum LOD value register is used to store and keep track of the maximum LOD values. An LOD bit field is used to track the finer regions of the display if the texture is not mipmapped. For this embodiment, the maxLOD clamp comprises discrete LOD values. These values are stored and transmitted back to an application or driver process sot that it can manage the amount of texture data to load over time. Such a feedback mechanism can be implemented as a process that accesses stored MaxLOD values and provides them to the appropriate application in a defined manner.

In an alternative embodiment, LOD/region residency bits are defined and used in place of a software-programmed LOD clamp. These bits are updated as levels are loaded and unloaded to determine the proper clamp level. In one embodiment, the LOD/region residency bits are stored in a register, such as register 106 of FIG. 3. Such a register may be implemented as a hardware register within a GPU executing the texture process, or it may be implemented as a software structure within a texture processing or rendering component.

The use of an LOD clamping table as described above facilitates efficient processing of textures in 3D graphics, because the process is not required to load more texture than is necessary during scaling, or similar operations. In one embodiment, the LOD clamping table may be stored as a discrete table or data element for use by the texture processor, such as shown by table 108 in FIG. 1.

The system described herein can be configured to enable the management of hierarchical textures, including texture arrays with different levels of detail per element. In addition, the LOD feedback can be used over time to predict future LOD requirements and prioritize texture LOD loading. In one embodiment, the application program controlling the rendering of the image controls this prediction feature. Alternatively, the texture generation system can include a prediction module that provides this feature.

The embodiments described herein generally reduce efforts related to software development and improves processing efficiency in texture processing operations. They also increase the accuracy of 3D object rendering and increase application interactivity smoothness and visual smoothness. Embodiments may be provided as software drivers that control operation of the GPU, or it may be provided as functionality coded directly into the GPU.

Although embodiments have been described with reference to graphics systems comprising GPU devices or visual processing units (VPU), which are dedicated or integrated graphics rendering devices for a processing system, it should be noted that such embodiments can also be used for many other types of video production engines that are used in parallel. Such video production engines may be implemented in the form of discrete video generators, such as digital projectors, or they may be electronic circuitry provided in the form of separate IC (integrated circuit) devices or as add-on cards for video-based computer systems.

In one embodiment, the system including the GPU control system and host processor comprises a computing device that is selected from the group consisting of: a personal computer, a workstation, a handheld computing device, a digital television, a media playback device, smart communication device, and a game console, or any other similar processing device.

Aspects of the system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), hardware description language instructions, custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the system is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the disclosed system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventor reserves the right to add additional claims after filing the application to pursue such additional claim forms for other aspects.

What is claimed is:

1. A method of processing one or more textures to be rendered, comprising:
    assigning each bound texture of one or more bound textures a corresponding unique identifier;
    defining a first tracking table associating a region of an image comprising a plurality of texture elements (texels) with a minimum rendered level-of-detail (LOD) value;
    indexing the tracking table using the unique identifiers for each of the bound textures; and
    updating a respective LOD value in the first tracking table if a current LOD value in a register is a finer level than the respective LOD value for a region of the texture in which a current text is located.

2. The method of claim 1 further comprising:
    determining the current LOD for the current texel to be used within a currently bound texture;
    storing the current LOD value in the register;
    accessing the first tracking table to retrieve the respective LOD value for the region;
    comparing the respective LOD value for the region with the current LOD value in the register.

3. The method of claim 2 further comprising providing LOD values from the first tracking table to a software application to enable it to load required levels of detail and regions, or to unload non-required levels of detail and regions of the one or more of the bound textures.

4. The method of claim 2 wherein the image comprises a plurality of regions, and wherein the first tracking table associates each region of the plurality of regions with a respective LOD value.

5. The method of claim 1 further comprising defining a second tracking table associating a region of an image comprising a plurality of texels with a maximum LOD value.

6. The method of claim 5 further comprising:
    determining a current LOD for a current texel to be used within a currently bound texture;
    storing the current LOD value in a register; determining in which region of the texture the current texel is located;
    accessing the second tracking table to retrieve the respective LOD value for the region; comparing the respective LOD value for the region with the current LOD value in the register; and
    updating the respective LOD value in the second tracking table if the current LOD value in the register is a finer level than the respective LOD value for the region.

7. The method of claim 1 further comprising storing LOD clamp values in a clamping table for the one or more bound textures to be mapped, wherein the clamping table is configured to store the finest level of detail loaded for the one or more bound textures.

8. The method of claim 7 wherein the bound texture comprises a single-level texture.

9. The method of claim 7 further comprising: loading different levels of detail in different regions of a mipmap into memory over time;
    updating the clamping table values as texel regions are loaded into the mipmap or removed from the mipmap;
    determining the current LOD for a current texel to be used within a currently bound texture; determining in which region of the texture the current texel is located;
    accessing the clamping table to retrieve the respective LOD clamp value for the region;
    comparing the respective LOD clamp value for the region with the current LOD value for the current texel; and
    replacing the current LOD value with the respective LOD clamp value, if the respective LOD value from the clamping table is coarser than the current LOD value.

10. The method of claim 8 wherein each entry in the clamping table comprises an LOD clamp value and an individual cell for each texture region of the plurality of texture regions, wherein each cell contains a region LOD value code, and further wherein each region LOD value code defines an LOD level finer than texture regions with corresponding LOD values that will not be loaded to the mipmap.

11. The method of claim 10 further comprising filtering the LOD values read from the clamping table through an interpolation process to generate a smooth continuum of clamp values.

12. A method of processing one or more textures to be rendered to form an image comprising one or more texture elements (texels), the method comprising:
loading different level-of-detail (LOD) values in different regions of a mipmap over time;
defining one or more LOD clamp values, each clamp value dictating a finest LOD value of a texture of the one or more textures to be loaded for a corresponding region;
storing the one or more LOD clamp values in a clamping table for the one or more bound textures to be mapped;
updating the clamping table values as texel regions are loaded into the mipmap; and
replacing a current LOD value with a respective LOD clamp value, if the respective LOD value from the clamping table is coarser than the current LOD value.

13. The method of claim 12 further comprising:
determining the current LOD for a current texel to be used within a currently bound texture;
determining the region of the image in which the current texel is located;
accessing the clamping table to retrieve the respective LOD clamp value for the region;
comparing the respective LOD clamp value for the region with the current LOD value for the current texel.

14. The method of claim 13, further comprising: assigning each bound texture of the one or more bound textures a corresponding unique identifier; defining a tracking table associating each texture region of the plurality of texture regions with a minimum level-of-detail; indexing the tracking table using the unique identifiers for each of the bound textures; and tracking the identifiers for the bound textures that index the tracking table.

15. The method of claim 14 further comprising:
loading different LOD values in different regions of a mipmap over time;
updating the clamping table values as texel regions are loaded into the mipmap;
determining the current LOD for the current texel;
determining the region of the image in which the current texel is located;
accessing the clamping table to retrieve the respective LOD clamp value for the region;
comparing the respective LOD clamp value for the region with the current LOD value for the current texel; and
replacing the current LOD value with the respective LOD clamp value, if the respective LOD value from the clamping table is coarser than the current LOD value.

* * * * *